United States Patent [19]

Morita et al.

[11] Patent Number: 4,779,470

[45] Date of Patent: Oct. 25, 1988

[54] ENGINE STARTER

[75] Inventors: Isamu Morita; Sadahiko Mani; Tohru Tochizawa, all of Tochigi; Hitoshi Eguchi; Yasuteru Koike, both of Gunma, all of Japan

[73] Assignee: Honda Giken Kogyo Kabushiki Kaisha, Tokyo, Japan

[21] Appl. No.: 83,187

[22] Filed: Aug. 10, 1987

[30] Foreign Application Priority Data

Aug. 11, 1986 [JP] Japan .............................. 123032[U]

[51] Int. Cl.⁴ ........................ F02N 15/06; F16D 3/68; F16D 3/74

[52] U.S. Cl. ....................................... 74/7 R; 74/7 A; 74/7 C; 74/7 E; 74/411; 192/55; 464/76; 464/92

[58] Field of Search .................... 74/6, 7 R, 7 A, 7 C, 74/7 E, 411; 192/55; 464/74, 76, 88, 92, 160

[56] References Cited

U.S. PATENT DOCUMENTS

| | | | |
|---|---|---|---|
| 2,075,078 | 3/1937 | Allen | 192/55 X |
| 2,477,175 | 7/1949 | Gee | 464/74 |
| 2,876,644 | 3/1959 | Clifton | 74/6 |
| 3,046,759 | 7/1962 | Deford et al. | 464/88 |
| 3,314,512 | 4/1967 | Kerestury | 464/76 X |
| 3,788,151 | 1/1974 | Campau | 464/76 X |
| 4,355,990 | 10/1982 | Duncan, Jr. | 464/74 X |
| 4,561,316 | 12/1985 | Bolz et al. | 74/7 E |

*Primary Examiner*—Allan D. Herrmann

*Attorney, Agent, or Firm*—Lyon & Lyon

[57] ABSTRACT

An engine starter in which a driven gear driven by the rotor of a starter motor and an output shaft driving a pinion meshing with the driven gear of an engine are mutually connected through a unidirectional clutch. The gear driven by the rotor and the clutch member driven by the driven gear are rotatably supported by, but separate from, the output shaft. Connection between the driven gear and the clutch member for torque transmission purposes is effected through a torque damper whereby the transmitted torque will be damped and engine noise reduced.

16 Claims, 5 Drawing Sheets

ENGINE STARTER

BACKGROUND OF THE INVENTION

The field of the present invention is starters for automotive engines. More particularly, the present invention relates to an engine starter of the type wherein a driven gear operated at a reduced speed by the rotor of a starting motor and an output shaft operably connected to said driven gear for driving a pinion gear that meshes with a ring gear of an engine are connected to each other through a unidirectional clutch that transmits the driving force only unidirectionally from the driven gear to the output shaft. Engine starters of this type are described, for example, in U.S. Pat. No. 4,440,033.

In such apparatus there generally occurs a positive load state in which the pinion gear mounted on the operating shaft drives the ring gear. Due primarily to the compression and expansion strokes of the engine at the time of cranking the engine by the engine starter, however, there may also occur a reverse load state in which the pinion is driven by the ring gear alternating in oscillating manner with the positive load state. This results in back lash noise generated by the meshed teeth of the pinion gear and the ring gear.

It is to the amelioration of this problem that the present invention is directed.

SUMMARY OF THE INVENTION

In accordance with the present invention there is provided an arrangement in which the gear driven by the starter motor rotor is rotatably supported on the clutch output shaft independently from the adjacent clutch member but connected to the adjacent clutch member through a torque damper that is effective to damp oscillations that may occur in the transmission torque.

Since the driven gear and the input member of the unidirectional clutch each have a relatively large diameter, a torque damper having a large load capacity can be interposed between them. Therefore when a positive load state in which a pinion gear drives an engine ring gear and a reverse load state in which the former is driven by the latter, occur alternately during cranking of the engine, these loads can be effectively damped by means of the torque damper described above.

Since the driven gear and the input member of the unidirectional clutch are rotatably supported by the output shaft independently of each other, no core oscillation occurs during the damping operation described above.

For a better understanding of thê invention, its operating advantages and the specific objectives obtained by its use reference should be made to the accompanying drawings and description which relate to preferred embodiments thereof.

DESCRIPTION OF A PREFERRED EMBODIMENT OF THE INVENTION

Figure 1:
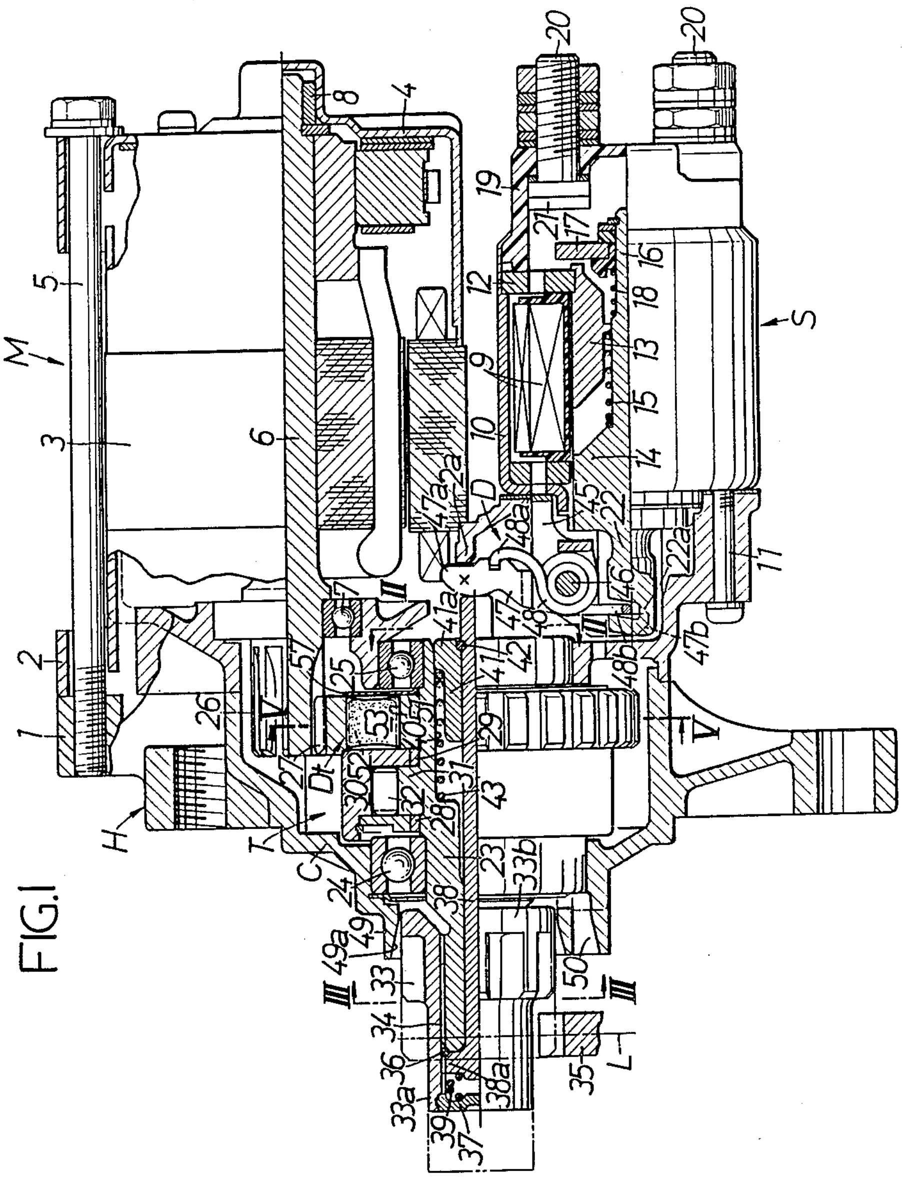
FIG. 1 is a side elevational view, partly in section, of a starter motor and unidirectional clutch organization according to the present invention.

In FIG. 1, which illustrates a first embodiment of the present invention, a transmission housing indicated generally by symbol H, comprises a front housing 1 and a rear housing 2 adapted for separable assembly. A starter motor M and an electromagnetic switch S for actuating the motor M are mounted in mutually parallel relation in the rear housing 2. The starter motor M includes a stator 3 consisting of stacked plates and a rear bearing bracket 4 closing the end of the stator 3. The stator 3, rear bearing bracket 4, and rear housing 2, are fixed to the front housing 1 by means of bolts 5. A rotor shaft 6 of the starter motor M is rotatably supported by the rear housing 2 and the bearing bracket 4 through a ball bearing 7 and a bearing bush 8, respectively, while its front, or output end portion projects into the transmission housing H.

The electromagnetic switch S includes a switch cylinder 10 for supporting a solenoid 9 fixed by screw 11 to the rear housing 2. A fixed core 13 is connected to the switch cylinder 10 through a yoke 12. A movable core 14 adapted to move forwardly or backwardly with respect to the front surface of the fixed core 13 is concentrically disposed within the solenoid 9. A return spring 15 interposed between the cores 13 and 14 operates to normally bias the movable core 14 away from the front surface of the fixed core 13. The movable core 14 has integrally formed thereon a switch operation rod 16 that extends through the fixed core 13. A movable contact 17 slidably mounted on the tip of the switch operation rod 16 is held thereat by the force of a compression spring 18. A terminal cap 19 formed of an insulating material is fixed at the rear end of the switch cylinder 10 by means of a pair of terminal bolts 20 that extend through the cylinder end wall. A pair of fixed contacts 21 in facing relation to the movable contact 17 are formed at the inner end portions of the bolts 20. Appropriate conductors (not shown) attached to the terminal bolts 20 electrically connect the starter motor M to a power source.

An operation rod 22 with an upturned hook 22*a*, that projects into the transmission housing H, is integrally formed on the movable core 14 at the forward end thereof. An output shaft 23 is disposed inside the transmission housing H at an intermediate position between, and parallel to, to rotor shaft 6 and the operation rod 22. The output shaft 23 is rotatably supported by the front and rear housings 1 and 2 through ball bearings 24 and 25, respectively, but cannot move in the axial direction. A transmisison organization, indicated generally as T, is also housed inside the housing H and is operative to transmit unidirectionally the driving force from the rotor shaft 6 to the output shaft 23.

The transmission organization T includes a driving gear 26 of relatively small diameter that is formed at the output end portion of the rotor shaft 6; a driven gear 27 of relatively large diameter rotatably supported on the outer peripheral surface of the output shaft 23 and meshing with the driving gear 26; a unidirectional clutch, generally indicated as C, mounted on the output shaft 23 adjacent the driven gear 27; and a torque damper Dt that connects the unidirectional clutch C to the driven gear 27. The unidirectional clutch C comprises a clutch outer member 30 rotatably supported by the output shaft 23 through a pair of bearing bushes 28 and 29; a clutch inner member 31 formed integrally on the outer peripheral portion of the output shaft 23 and concentrically disposed within the clutch outer 30; and a plurality of wedge rollers 32 interposed between the clutch outer member 30 and clutch inner member 31. The unidirectional clutch C has a unidirectional transmission function such that, though it transmits the torque from the clutch outer member 30 to the clutch inner member 31, it does not transmit load in the reverse direction.

Figure 5:
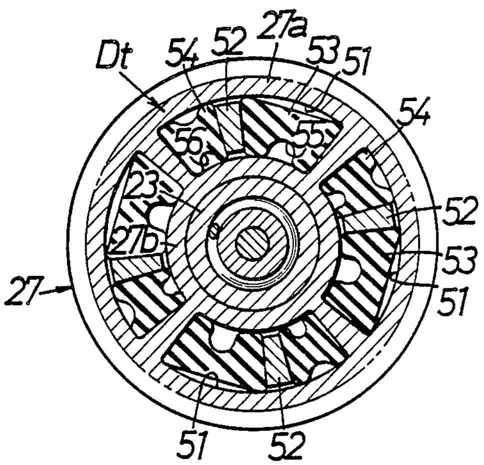
FIG. 5 is a view taken along line V—V of FIG. 1.

As shown in FIGS. 1 and 5, the torque damper Dt comprises a plurality of fan-shaped damper chambers 51 formed equidistantly about the circumference of the driven gear 27 between the rim **27*a* and hub 27*b* thereof. A plurality of transmission projections 52 formed integrally on the side surface of the clutch outer member 30 project outwardly therefrom into the damper chambers 51. Each damper chamber 51 contains a pair of first and second damper rubbers 53 and 54, respectively, positioned each on opposite sides of the projection 52. When the driven gear 27 drives the clutch outer members 30 during the so-called, positive load state, the resultant compressive force acts upon the first damper rubber 53 positioned between one end wall of the damper chamber 51 and the transmission projection 52. Alternatively, during the so-called, reverse load state, when the driven gear 27 is driven, the compressive force acts upon the second damper rubber 54 positioned between the other end wall of the damper chamber 51 and the transmission projection 52. The load capacity of the first damper rubber 53 may be set to be greater than that of the second damper rubber 54. Recesses or gaps 55 and 56 may also be formed on the peripheral planes of the damper rubbers 53 and 54 in order to provide them with predetermined damping characteristics. As shown, the side surface of each damper chamber 51 opposite that which receives the projection 52 is closed by an annular lid plate 57 which is supported by the output shaft 23**.

The outer axial end portion of the output shaft 23 projects forwardly beyond the front surface of the front housing 1. A cylindrical boss **33*a* formed on the pinion gear 33 is connected by a spline 34 to the outer periphery of the outer axial end portion of the output shaft 23 so that the former is slidably movable back and forth on the latter. A ring gear 35 forming part of the engine drive is disposed to receive the pinion gear 33** at a predetermined advance position of the latter.

As shown in FIG. 1, the outer end of the output shaft 23 extends forwardly beyond the center line L of the ring gear 35 in the axial direction so that when the pinion gear 33 drives the ring gear 35, any inclination of the pinion gear 35 due to the driving reaction is prevented and both gears 33 and 35 can be thus held in the proper engagement state.

The open end of the cylindrical boss **33*a* of the pinion gear 33 is closed by a closure plate 37 that is caulked or otherwise sealingly connected to the open end of the boss in order to prevent intrusion of any dust into the interior of the boss 33*a***.

When the electromagnetic switch S is actuated, the pinion gear 33 is caused to be shifted to the engagement position with the ring gear 35 by means of a pinion moving device D disposed on the housing H. The pinion moving device D has an axially moving connecting rod 38 that slidably penetrates the axial core portion of the output shaft 23. A push flange **38*a* formed at the front end of the connecting rod 38 is moved by the connecting rod back and forth between the closure plate 37 of the cylindrical boss 33*a* and an anchor ring 36 fixed to the inner wall of the boss 33*a*. A barrel-shaped buffer coil spring 39 is disposed between the flange 38*a* and the closure plate 37**.

The rear end of a hollow interior portion of the output shaft 23 is of a diameter sufficient to form a guide hole 40. A spring-receiving cylinder 41 having an end flange **41*a*, that engages the surface of the hole 40 for slidable movement, is fixed to the exterior of the connecting rod 38 by an anchor ring 42. A coil spring 43 is disposed in the guide hole 40 between the bottom thereof and the annular shoulder formed by flange 41*a* so as to bias the moving rod 38** in the rearward direction.

Figure 2:
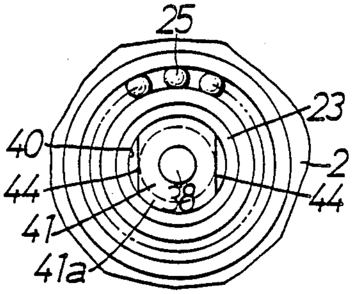
FIG. 2 is a view taken along line II—II of FIG. 1.
Figure 3:
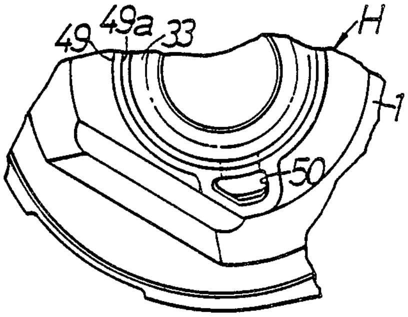
FIG. 3 is a view taken along line III—III of FIG. 1.

As shown in FIG. 2, a pair of opposed flats 44 are formed on the outer periphery of the flange **41*a* of the spring-receiving cylinder 41 and serve as vent holes for communicating the guide hole 40 with the interior of the transmission housing H. Thus, the spring receiving cylinder 41 in the guide hole 40** can slide without any internal air resistance.

Figure 4:
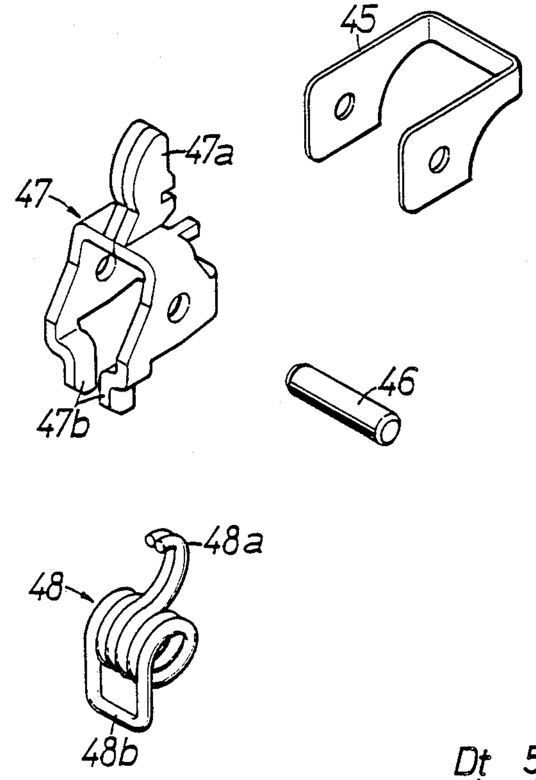
FIG. 4 is an exploded perspective view of the pinion-moving device of the organization of FIG. 1.

As shown specifically in FIG. 4, the pinion moving device D includes a lever holder 45 fixed to the transmission housing H; a shift lever pivotally supported by the lever holder 45 through a pivot pin 46; and an overload spring 48, comprising a helical spring wound about the outer periphery of the pivot pin 46. The shift lever 47 has a first arm **47*a* on one side of pivot pin 46 that engages the rear end of the connecting rod 38 and a second, bifurcate arm 47*b* on the other side of pin 46 that extends in the opposite direction from the first arm 47*a*. Oppositely extending first and second anchor arms 48*a* and 48*b* of the overload spring 48 engage the rear surfaces of the arms 47*a* and 47*b*, respectively, of shift lever 47 and a predetermined torque is imparted as a set load to the coil portion of the spring 48. The second anchor arm 48*b* of spring 48 extends transversely between the bifurcate arms 47*b* of the shift lever 47 and the hook 22*a* of the operation rod 22 extends intermediate the arms 47*b* to engage the transversely extending portion of the spring arm 48*b***.

In the construction described above, the effective length of the second anchor arm **48*b* of the spring 48 is smaller than the first arm 48*a*. The movement of the operation rod 22, however, can be amplified or reduced in being transmitted to the connecting rod 38** by selecting the appropriate ratio of the length of these arms.

The retracted positions of the pinion gear 33, connecting rod 38 and shift lever 47, due to the action of the return spring 43, are restricted by the abutment of the rear surface of the first arm **47*a* of the shift lever 47 against the stopper portion 2*a* formed on the inner wall of the rear housing 2**.

A pinion housing 49 for storing the rearward portion of the pinion gear 33, when it is retracted from the ring gear 35, is formed at the front end of the transmission housing H and its interior surface **49*a* diverges outwardly to guide the movement of the pinion gear 33 into the pinion housing. By means of this arrangement, any moisture, such as rain water, washing liquid, or the like, that enters the housing 49 is guided by the tapered surface of the interior surface 49***a* and immediately discharged from the housing. As shown, the pinion housing 49 is equipped below its interior surface 49*a* with a drain port 50 for communicating the interior of the housing with the outside thereof. To assist moisture discharge, the drain port 50 has a downward gradient toward its outlet. Therefore, even if water enters the pinion housing 49, it can be discharged immediately by this drain port 50. On the other hand, an annular closing wall 33*b* formed integrally across each gear tooth at the rear end of the pinion gear 33, prevents entrance of the water into the pinion housing 49 through the spaces between the respective gear teeth of the pinion gear 33. The wall 33*b* also serves to reinforce the respective gear teeth.

The operation of the disclosed organization is as follows. When the starting switch of the engine is operated to supply a current to the solenoid 9 of the electromagnetic switch S, the movable core 14 is attracted to the fixed core 13 and the operation rod 22 pivots the shift lever 47 counterclockwise in FIG. 1 around the pivot pin 46 through the overload spring 48. Thus, the first arm 47*a* pushes forward (to the left as viewed in FIG. 1) the connecting rod 38. As the connecting rod 38 advances against the buffer spring 39, the push flange 38*a* moves the pinion gear 33 axially outwardly to mesh with the ring gear 35.

At this time, if the teeth of the respective gears 33 and 35 do not coincide and the side surfaces of the teeth impinge against one another, the connecting rod 38 moves forwardly to a position in contact with the closure plate 37 compressing the damper spring 39 while leaving the pinion gear 33 at the impingement position against the ring gear 35. Movable core 14 moves back to the close contact position with the fixed core 13 while twisting the overload spring 48. In this manner, the shock of impingement between both gears 33 and 35 can be absorbed through the elastic deformation of both springs 39 and 48 described above.

Also, at this time, the movable contact 17 comes into contact with the pair of fixed contacts 21 substantially simultaneously with the attraction of the movable core 14 by the fixed core 13 and supplies the current to, and actuates, the starting motor M.

Since the output shaft 23 is driven at a reduced speed by the rotation of the rotor shaft 6 through the driving gear 26, the driven gear 27 and further through the torque damper Dt and the unidirectional clutch C, the pinion gear 33 will be caused to rotate with a large driving torque, but without any impact.

If, on the other hand, the teeth of the pinion gear 33 are able to mesh with those of the ring gear 35 at the initial stage of rotation of the pinion gear 33, the resilient force stored in the overload spring 48 advance the pinion gear 33 so that the pinion gear 33 meshes completely with the ring gear 35 to drive it, and thus, the engine is cranked and started.

Figure 7:
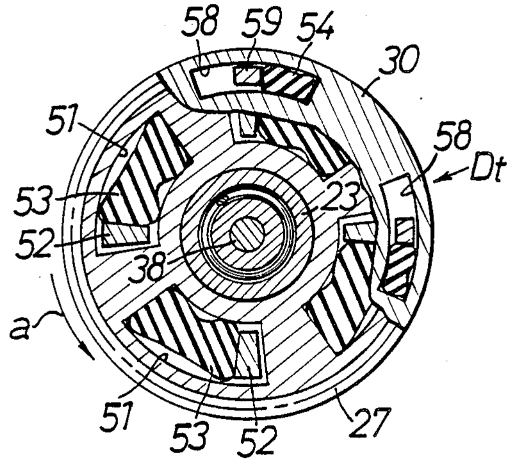
FIG. 7 is a sectional view taken along line VII—VII of FIG. 6.

If a positive load state in which the pinion gear 33 drives the ring gear 35 occurs oscillatingly and alternately with a reverse load state in which the former is driven by the latter due to the compression and expansion strokes of the engine during its cranking, the first damper rubbers 53 in the torque damper Dt in coacting with the projections 52 undergo compressive deformation and damp the positive load. (This is illustrated in FIG. 7, which shows the driven gear 27 driving the clutch outer member 30 in the direction represented by arrow a.) Alternatively, the second damper rubbers 54 similarly undergo compressive deformation and damp the reverse load when the clutch outer member 30 drives the driven gear 27 in the direction represented by arrow a in FIG. 7 at the time of the reverse load. Accordingly, the damper rubbers 53 and 54 in coacting with the projections 52 absorb the impact which develops due to engagement between the pinion gear 33 and the ring geat 35 and, thereby, reduce the back-lash noise.

In the described arrangement, the driven gear 27 and the clutch outer member 30 undergo relative anular displacement with repect to each other in order to permit the first and second damper rubbers 53 and 54 to provide the damping action, but oscillation of the axes of these members 27 and 30 does not occur because the driven gear 27 is independently supported by the output shaft 23 at its hub 27 *b,* while the clutch outer 30 is supported independently of the driven gear 27 by the bearing bushes 28 and 29 on the output shaft. Therefore, proper engagement between the driving and driven gears 25 and 27, as well as the engagement of the members comprising the unidirectional clutch C, are effected properly and an excellent transmission state can be obtained.

On the other hand, when the ring gear 35 rotates at a high speed after the start of the engine and drives the pinion gear 33 at a higher speed than the rotation of the driven gear 27, the members 30 and 31 of the unidirectional clutch C are released by the rollers 28, as is known, and the reverse loading imposed by the ring gear 35 is not transmitted to the starting motor M and its overrun is thus prevented.

When the starting switch is deactuated after the engine start, the movable core 14 of the electromagnetic switch S is returned to its initial position by he force of the return spring 15. At the same time, the movable contact 17 is moved away from the fixed contact 21 to deactuate the starter motor M. Retrograde movement of the movable core 14 also causes connecting rod 38 to be simultaneously retracted to its orignal position by the force of the return spring 43 whereby the pinion gear 33 is disengaged from the ring gear 35 and stored in the pinion housing 49.

Figure 6:
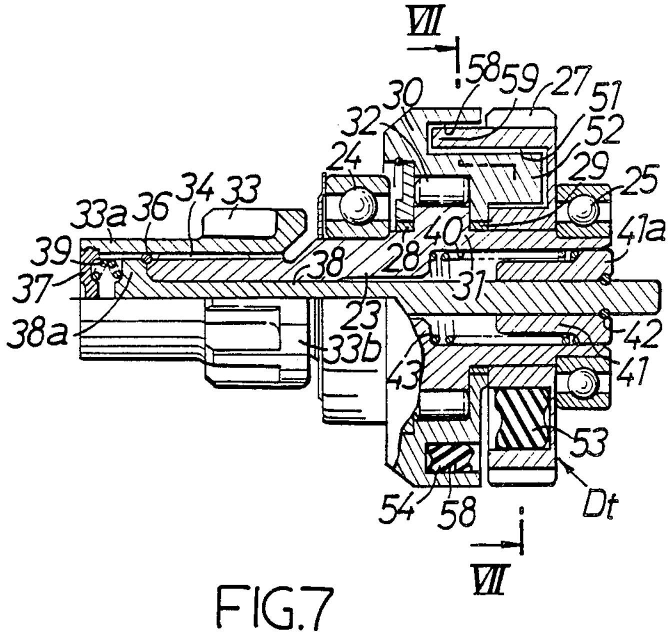
FIG. 6 is a longitudinal sectional view of a second embodiment of the present invention.

FIGS. 6 and 7 illustrate a second embodiment of the present invention, which differes from the first embodiment in the structure of the torque damper Dt. In this embodiment, the damper chamber 51 formed in the driven gear 27 is used only for storing the first damper rubber 53, and the second damper rubber 54, having a small load capacity, is stored in a fan-shaped second damper chamber 58 that is formed on the surface of the clutch outer 30 disposed in opposed facing relation to the driven gear 27. As shown in FIG. 7, a plurality of second damper chambers 58 are disposed equidistantly about the circumference of the clutch outer member 30. A transmission pawl 59 is operative in each second damper chamber 58 to compress the second damper rubber 54 therein in cooperation with one end wall of the respective second damper chamber 58 upon occurrence of the reverse load. The projections 59 are formed on the facing side surface of the driven gear 27 and project into the respective chambers 58. The balance of the construction details are the same as those of the first invention embodiment; accordingly, the portions of FIGS. 6 and 7 that correspond to those of the embodiment illustrated in FIGS. 1-5 are represented by like reference numerals.

It will be appreciated that in this embodiment, the first damper rubber 53, having a large load capacity, can be stored in the damper chamber 51 of the driven gear 27 without being restricted by the second damper rubber 54. Therefore, this embodiment is particularly suitable for starters of a type adapted for high speed rotation.

Figure 8:
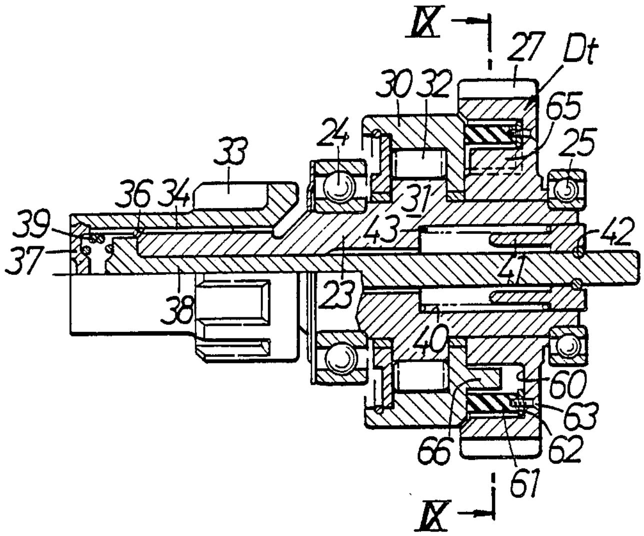
FIG. 8 is a longitudinal sectional view of a third embodiment of the present invention.
Figure 9:
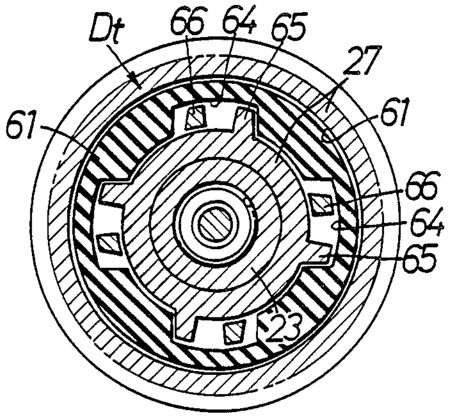
FIG. 9 is a sectional view taken along line IX—IX of FIG. 8.

FIGS. 8 and 9 depict a third embodiment of the invention, which differs from the foregoing embodiments in the structure of the torque damper Dt. Specifically, an annular damper rubber 61 is housed in an annular damper chamber 60 formed as a recess in the surface of the driven gear 27 facing the clutch outer member 30. One of the ends of this damper rubber 61 is bonded to one of the end surfaces of the clutch outer member 30 as by means of baking with the other end being similarly bonded to an annular fitting plate 62. This fitting plate 62 is, in turn, fixed to the inner wall of the damper chamber 60 by screws 63. In this manner, the annular damper rubber 61 effects a resilient connection of the driven gear 27 to the clutch outer member 30. Therefore, the positive and reverse loads applied between the driven gear 27 and the clutch outer member 30 can be damped by the torsional deformation of the damper rubber 61.

As shown in FIG. 9, a plurality of recesses 64 are formed on equidistant spacing about the inner peripheral surface of the damper rubber 61. The recesses 64 each receive a pair of transmission projections 65 and 66 that are formed integral with, and project outwardly from, the opposed surfaces of the driven gear 27 and clutch outer member 30, respectively. A gap is defined between the respective transmission projections 65 and 66 so as not to hinder the damping action of the damper rubber 61. Though not contributing to the normal transmission of power, these transmission projections 65 and 66 may come into mutual contact and carry out torque transmission when the damper rubber 61 may become broken accidentally.

It will be appreciated that, in accordance with the present invention there is provided an arrangement in which the driven gear and the input member of the clutch adjacent to the driven gear are rotatably supported by the output shaft independently of each other and are connected to each other through a torque damper that damps the transmission torque between them. By means of the described structure, it is possible to utilize a torque damper having a sufficiently large load capacity to effectively damp the positive and reverse loads of the pinion gear. Thus, back-lash noise which may be generated by the engagement of the gear teeth of the pinion gear and the ring gear can be reduced. Moreover, by means of the arrangement no core oscillation can occur between the driven gear and the input member of the unidirectional clutch during this damping action, and an excellent state of torque transmission can be obtained.

It will be understood that various changes in the details, materials and arrangements of the parts which have been herein described and illustrated in order to explain the nature of the invention, may be made by those skilled in the art within the principle and scope of the invention as expressed in the appended claims.

We claim:

1. In an engine starter of the type in which a driven gear driven by the rotor of a starter motor and an output shaft for driving a pinion gear that meshes with an engine ring gear are interconnected through clutch means operative to transmit the driving force from said driven gear to said output shaft, the improvement comprising:

said driven gear and an input member of said clutch means being rotatably supported in mutually adjacent relation on said output shaft;

torque damper means operatively connecting said driven gear and said clutch means input member, said torque damper means comprising resilient body means disposed in one of said driven gear and said input member and a projection means extending from the other of said driven gear and said input member, said projection means engaging said resilient body means for the transmission of torque between said driven gear and said input member.

2. The improvement according to claim 1 in which said resilient body means comprises a pair of angularly spaced rubbers and said projection means is interposed between said rubbers.

3. The improvement according to claim 2 in which one of said rubbers has a greater load damping capacity than the other of said rubbers.

4. The improvement according to claim 3 in which said one rubber is compressed by said projection means during the positive load state of said clutch means and said other rubber is compressed by said projection means during the reverse load state thereof.

5. In an engine starter of the type in which a driven gear driven by the rotor of a starter motor and an output shaft for driving a pinion gear that meshes with an engine ring gear are interconnected through clutch means operative to transmit the driving force from said driven gear to said output shaft, the improvement comprising:

said driven gear and an input member of said clutch means being rotatably supported in mutually adjacent relation on said output shaft;

torque damper means operatively connecting said driven gear and said clutch means input member, said torque damper means comprising first resilient body means disposed in one of said driven gear and said input member and first projection means extending from the other of said driven gear and said input member for the transmission of torque therebetween in one angular direction and second resilient body means disposed in the other of said driven gear and said input member and second projection means extending from said one of said driven gear and said input member for the transmission of torque therebetween in the opposite angular direction.

6. The improvement according to claim 5 in which said first resilient body means has a greater load damping capacity than said second resilient body means.

7. In an engine starter of the type in which a driven gear driven by the rotor of a starter motor and an output shaft for driving a pinion gear that meshes with an engine ring gear are interconnected through clutch means operative to transmit the driving force from said driven gear to said output shaft, the improvement comprising:

said driven gear and an input member of said clutch means being rotatably supported in mutually adjacent relation on said output shaft;

torque damper means operatively connecting said driven gear and said clutch means input member, said torque damper means comprising an annular body of resilient material interposed between and having the axial ends thereof connected to said driven gear and said input member.

8. The improvement according to claim 7 including a plurality of circumferentially spaced recesses in said annular body; first pawl means projecting from one of said driven gear and said input member and extending into said annular body recesses; and second pawl means projecting from the other of said driven gear and said input member and extending into said annular body recesses in angularly spaced relation from said first pawl means.

9. An engine starter organization for transmitting torque from the rotor of a starter motor to a pinion gear that meshes with the driven gear of an engine, comprising:

an output shaft drivingly connecting said pinion gear;

clutch means concentrically disposed about said output shaft including a clutch inner member integrally attached to said output shaft, a clutch outer member rotatably mounted on said shaft, and means for selectively engaging said clutch inner member and said clutch outer member disposed therebetween;

an input gear drivingly connected to said rotor rotatably mounted on said output shaft axially spaced relation to said clutch outer member;

torque damper means operatively connecting said input gear to said clutch outer member for damping the torsional forces transmitted therebetween, said torque damper means comprising angularly resilient body means attached to said input gear; and projection means extending from the adjacent face of said clutch outer member into engagement with said resilient body, whereby said resilient body means is compressed by said projection means upon relative rotation between said input gear and said clutch outer member.

10. An engine starter organization for transmitting torque from the rotor of a starter motor to a pinion gear that meshes with the driven gear of an engine, comprising:

an output shaft drivingly connecting said pinion gear;

clutch means concentrically disposed about said output shaft including a clutch inner member integrally attached to said output shaft, a clutch outer member rotatably mounted on said shaft, and means for selectively engaging said clutch inner member and said clutch outer member disposed therebetween;

an input gear drivingly connected to said rotor rotatably mounted on said output shaft in axially spaced relation to said clutch outer member;

torque damper means operatively connecting said input gear to said clutch outer member for damping the torsional forces transmitted therebetween, said torque damper means comprising a plurality of recesses circumferentially spaced about the surface of said input gear in facing relation to said cluctch outer member;

a body of resilient material disposed in each of said recesses;

a plurality of projection extending from the adjacent face of said clutch outer member, each into one of said recesses in engagement with the body of resilient material therein wherein said bodies of resilient material are compressed by said projections upon relative rotation between said input gear and said clutch outer member.

11. The organization according to claim 10 in which said recesses each contain a pair of bodies of resilient material disposed on opposite side of the projection therein.

12. The organization according to claim 11 in which the body of resilient material compressed by said projection when said input gear drives said clutch outer member having a greater load damping capacity than the body of resilient material compressed by said projection when said clutch outer member drives said input gear.

13. An engine starter organization for transmitting torque from the rotor of a starter motor to a pinion gear that meshes with the driven gear of an engine, comprising:

an output shaft drivingly connecting said pinion gear;

clutch means concentrically disposed about said output shaft including a clutch inner member integrally attached to said output shaft, a clutch outer member rotatably mounted on said shaft, and means for selectively engaging said clutch inner member and said clutch outer member disposed therebetween;

an input gear drivingly connected to said rotor rotatably mounted on said output shaft in axially relation to said clutch outer member;

torque damper means operatively connecting said input gear to said clutch member for damping the torsional forces transmitted therebetween, said torque damper means comprising a plurality of recesses circumferentially spaced about the surface of said input gear in facing relation to said clutch outer member;

a plurality of recesses circumferentially spaced about the surface of said clutch outer member in facing relation to said input gear;

each of said recesses containing a body of resilient material; and a plurality of projections extending from said facing surfaces of said input gear and said clutch outer member and extending into bearing engagement with the body of resilient material in the facing recess.

14. The organization according to claim 13 in which said bodies of resilient material in said recesses in said input gear are of greater load damping capacity than those in said recesses in said clutch outer member.

15. An engine starter organization for transmitting torque from the rotor of a starter motor to a pinion gear that meshes with the driven gear of an engine, comprising:

an output shaft drivingly connecting said pinion gear;

clutch means concentrically disposed about said output shaft including a clutch inner member integrally attached to said output shaft, a clutch outer member rotatably mounted on said shaft, and means for selectively engaging said clutch inner member and said clutch outer member disposed therebetween;

an input gear drivingly connected to said rotor rotatably mounted on said output shaft in axially spaced relation to said clutch outer member;

torque damper means operatively connecting said input gear to said clutch outer member for damping the torsional forces transmitted therebetween, said torque damper means comprising an annular recesses formed in the surface of one of said input gear and said clutch outer member in facing relation to the other;

an annular body of resilient material disposed in said recess; and the axial ends of said body of resilient material being attached to the adjacent surface of said input gear and said clutch outer member, respectively.

16. Organization according to claim 15 in which said body of resilient material includes a plurality of circumferentially spaced recesses; a plurality of projections extending oppositely into said recesses from each of the facing surfaces of said input gear and said clutch outer member whereby each said recess contains a projection from each of said input gear and said clutch outer member; said projections in each said recess being adapted to engage each other to transmit torque between said input gear and said clutch outer member upon failure of said body of resilient material.

* * * * *

UNITED STATES PATENT AND TRADEMARK OFFICE
CERTIFICATE OF CORRECTION

PATENT NO. : 4,779,470

DATED : October 25, 1988

INVENTOR(S) : Isamu Morita, et al.

It is certified that error appears in the above-identified patent and that said Letters Patent are hereby corrected as shown below:

In column 9, line 25, after "shaft" insert -- in --.

In column 10, line 25, after "axially" insert -- spaced --.

Signed and Sealed this

Twenty-first Day of March, 1989

*Attest:*

DONALD J. QUIGG

*Attesting Officer*

*Commissioner of Patents and Trademarks*